United States Patent
Träubel et al.

(10) Patent No.: US 6,254,644 B1
(45) Date of Patent: Jul. 3, 2001

(54) BIOLOGICALLY DEGRADABLE LEATHER

(75) Inventors: Harro Träubel, Leverkusen; Hanns-Peter Müller, Odenthal; Helmut Reiff; Jürgen Reiners, both of Leverkusen; Gerd-Friedrich Renner, Kürten; Rainhard Koch, Köln; Karl Pisaric, Pulheim, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/367,992

(22) PCT Filed: Feb. 13, 1998

(86) PCT No.: PCT/EP98/00804

§ 371 Date: Aug. 23, 1999

§ 102(e) Date: Aug. 23, 1999

(87) PCT Pub. No.: WO98/38340

PCT Pub. Date: Sep. 3, 1998

(30) Foreign Application Priority Data

Feb. 26, 1997  (DE) ............................ 197 07 578
Aug. 21, 1997  (DE) ............................ 197 36 309

(51) Int. Cl.$^7$ ............................................. C14C 3/00
(52) U.S. Cl. ................... 8/94.19 R; 8/436; 8/437; 428/473
(58) Field of Search ................. 8/436, 437, 94.19 R; 428/473

(56) References Cited

U.S. PATENT DOCUMENTS

| | | | |
|---|---|---|---|
| 4,237,264 | 12/1980 | Noll et al. | 528/67 |
| 4,529,792 | 7/1985 | Barrows | 528/291 |
| 5,310,782 | 5/1994 | Takiyama et al. | 524/706 |
| 5,401,582 | * 3/1995 | Weyland et al. | 426/473 |
| 5,496,909 | 3/1996 | Muhlfeld et al. | 528/76 |
| 5,618,317 | * 4/1997 | Traubel et al. | 8/94.19 |
| 5,885,474 | 3/1999 | Reiners et al. | 252/8.57 |

FOREIGN PATENT DOCUMENTS

| | | |
|---|---|---|
| 44 22 246 | 1/1996 | (DE) . |
| 197 07 578 | 8/1998 | (DE) . |
| 593975 | 3/1997 | (EP) . |
| 1336050 | 11/1973 | (GB) . |
| 54-0119594 | 9/1979 | (JP) . |
| 54-119593 | 9/1979 | (JP) . |

OTHER PUBLICATIONS

Ges–Abh.der Deutschen, Freiburg, Stather et al (month unavailable), 1962, pp. 37–55, "Welche Mindestgerbstoffmengen sind zur Umwandlung von Haut in Leder Notwendig?".

H. Oertel et al (month unavailable), 1994, pp. 188–198, "Vegetabilische Gerbstoffe "nach Mass"– Ein Beitrag Zur Sicherung der Rohstoffgrundlage der Lederindustrie".

J. B. Harborne, Ökologische Biochemie, Heidelberg, (month unavailable), 1995, pp. 168–170, "Der Kleine Frostspanner und die Tannine der Eichenblätter".

F. Stather, "Gerbercichemie und Gerhereitechnologie", Akademie Verlag, Berlin (month unavailable), 1967, pp. 447–489, "Die Bindung der Fettungsmittel im Leder".

Methoden der Organischem Chemie (Method of Organic Chemisry) $4^{th}$ edition, vol. XIVII, Georg Thieme Verlag Stuttgart (month unavailable), 1961, pp. 190–208, "Speziell für die Emulsionspolymerisation geeignete Emulgatoren$^3$".

* cited by examiner

Primary Examiner—Yogendra N. Gupta
Assistant Examiner—D G Hamlin
(74) Attorney, Agent, or Firm—Joseph C. Gil; Richard E. L. Henderson

(57) ABSTRACT

The present invention relates to a process for preparing leather by
  (I) tanning a pelt with
    (a) an aldehyde, or
    (b) a bisulphite-blocked polyisocyanate;
  (II) optionally, retanning the pelt with
    (a) a polyaspartic acid, a salt of a polyaspartic acid, a polyaspartic acid anhydride, or a mixture thereof, and/or
    (b) a polyaspartamide;
  (III) dressing the resultant product by
    (a) bottoming the product with a polyurethane and one or more natural bottoming assistants, and
    (b) applying a polyurethane and/or polyesteramide finish; and
  (IV) optionally, aftertreating the resultant dressed leather with a leather preservative.

7 Claims, No Drawings

BIOLOGICALLY DEGRADABLE LEATHER

The invention relates to biodegradable leather and to a process for its preparation.

Tanning converts animal skins, with crosslinking of the collagen, into leather. One of the most important features of the leather is the increased shrinkage temperature compared with untanned skins, i.e. the enhanced hot-water resistance, and the white appearance (not transparent) after drying.

The method of tanning still predominant today is chrome tanning, in which covalent bonds having a crosslinking effect are formed with the carboxyl groups of the collagen using chromium(III) compounds under the influence of OH ions. By contrast, the hydrogen bonds to the amide groups of the collagen that are obtainable using polyfunctional vegetable tanning agents are much weaker, which is evident inter alia in an only moderately increased shrinkage temperature. Aliphatic aldehydes too, such as glutaraldehyde, for example, which lead to crosslinking by way of primary amino groups of the collagen, have been recommended as tanning agents (U.S. Pat. No. 2,941,859).

The use of aliphatic diisocyanates such as hexamethylene diisocyanate (DE-C 72,981) has, for toxicological reasons, not become established.

The use of bisulphite-blocked aliphatic, cycloaliphatic or aromatic diisocyanates such as hexamethylene diisocyanate, isophorone diisocyanate and tolylene diisocyanate as tanning agents, as is recommended in U.S. Pat. No. 2,923,594 and 4,413,997, does indeed lead to leathers which are light in colour and in the case of the aliphatic isocyanates are even light-fast, but the tanning liquors are not pH-stable.

On the part of the automotive industry there is an increasing desire for leathers which on the one hand are free from heavy metals and on the other hand can be disposed of without problems, for example by composting. Since leather, according to a definition from Stather and Pauligk, is "skin which no longer rots" (Ges. Abh. des deutschen Lederinstituts Freiburg 17 (1962), p. 37), it would appear that there is a preprogrammed conflict of interests here: compostable leather would not correspond to the said definition, and it would have to be assumed that such "leathers" would also lack some of the properties which make them suitable for everyday use. This implies that tanning, inter alia, is also to be understood as a method of preservation.

According to the guidelines of the German state working committee on waste (LAGA 10), (conventionally prepared) leather is among those substances which must not be disposed of in composting plants since they are not biodegradable and owing to- their heavy metal content represent a hazard to the humus and the ground water.

The search for biodegradable tanning agents of natural origin is under way (see for example H. Oertel, G. Reich, L. Meyer, E. Lange "Vegetabilische Gerbstoffe nach Maβ—ein Beitrag zur Sicherung der Rohstoffgrundlage der Lederindustrie" [Vegetable tanning agents to order—a contribution to securing the raw materials base in the leather industry], Das Leder 1994, pp. 188 to 198). However, even tanning agents of natural origin are not eo ipso biodegradable, since they are produced by the plant to protect against attack by microbes and fungi and against being eaten; cf. J. B. Harborne, Ökologische Biochemie, Heidelberg 1995, p. 170.

Meeting the requirements placed on biodegradable leather appeared to be barely possible:

On the one hand, the customer of course expects even biodegradable leathers to have complete suitability for use; on the other hand, the preservation of such leathers gives rise to problems. Leather is a hydrophilic material having a very large internal surface area, and therefore constitutes an ideal nutrient base for bacteria and fungi. During their growth, microbes frequently release enzymes which damage the material. For reasons of hygiene as well, microbes and fungi which grow in the leather are undesirable.

One of the consequences of tanning is that the biological breakdown of protein is prevented. The biodegradation of tanned product has therefore appeared to date to be a contradiction in terms.

From DE-A 4 422 246 it is known that leather can be biologically degraded with thermophilic microorganisms in the presence of oxygen. Inorganic constituents are obtained in this case as the chromium(III) oxide or chromium(III) salt and can be passed to a recovery stage. This process constitutes a decisive step in the direction of the biodegradability of leather. However, it sets requirements which are often difficult to fulfil in terms of the microorganisms which can be used and of the inorganic constituents.

It has now been surprisingly found that it is possible without the use of chromium, titanium, iron, aluminium and zirconium tanning agents to obtain biodegradable and yet serviceable leathers if low-salt pretanning or tarming is carried out with a reactive organic tanning agent and then substantially or completely biodegradable products are used for the subsequent processes.

The invention therefore provides a process for preparing leather, according to which
 I. Pelts are (pre)tanned with
  a) aldehydes or
  b) bisulphite-blocked polyisocyanates,
 II. if desired, the resulting product is (re)tanned with
  a) polyaspartic acid, its salts and/or its anhydrides and/or
  b) polyaspartamides,
 III.
  a) the resulting product is bottomed with polyurethane and auxiliaries based on natural substances,
  b) a finish of polyurethane and/or polyesteramide is applied, and
 IV. the leather thus dressed is aftertreated, if desired, with a leather preservative.

Tanning agents and assistants selected within the context of the invention are preferably products which in accordance with DIN 54 900, Part 3 (draft) are at least 30, preferably at least 50 and, in particular, at least 60% by weight biodegradable. With preference, at least 60% by weight of the sum of all tanning agents and assistants employed is biodegradable.

Preferred aldehydes I a) comprise formaldehyde, acrolein, crotonaldehyde, glyoxal, glutardialdehyde and aldehydes obtainable by the oxidation of fats—i.e. compounds and mixtures as described, for example, in F. Stather, "Gerbereichemie und Gerbereitechnologie", Akademie Verlag Berlin 1967, p. 477 ff.

Preferred "bisulphite-blocked polyisocyanates" I b) are the products of reaction of
 A. organic polyisocyanate,
 B. based on isocyanate equivalent of A, from 0 to 0.4 equivalents of polyether alcohol with incorporated polyalkylene oxide units (the equivalents are based on the hydroxyl groups of the polyether alcohol), from 40 to 100, preferably from 50 to 100 mol-% of the polyalkylene oxide units consisting of polyethylene oxide units with a sequence length of from 5 to 70, preferably from 6 to 60 and, in particular, 7 to 40, C. if desired, other NCO-reactive components, and D. ammonium or alkali metal bisulphites or disulphites.

The reaction products I b).above can be obtained from the intermediates, themselves obtainable from A, B and, if desired, C, having NCO contents of from 3 to 50, preferably from 5 to 45 and, in particular, from 20 to 45% by weight (based on intermediate) by subsequent blocking of the free isocyanate groups. The product I b) then contain—calculated as sodium salt and based on solids—from 9.7 to 78, preferably from 14 to 74 and, in particular, from 46.5 to 74% by weight of carbamoylsulphonate groups.

Suitable organic polyisocyanates A) are aliphatic, cycloaliphatic, araliphatic, aromatic or heterocyclic polyisocyanates as are described, for example, by W. Siefken in Liebigs Annalen der Chemie 562, pages 75 to 136.

Preferred polyisocyanates A) are compounds of the formula Q(NCO)$_n$ having a mean molecular weight of below 800, in which n is a number which is at least 2, preferably from 2 to 4, Q is an aliphatic $C_4$–$C_{12}$-hydrocarbon radical, a cycloaliphatic $C_6$–$C_{15}$-hydrocarbon radical, an araliphatic $C_7$–$C_{15}$-hydrocarbon radical or a heterocyclic $C_2$–$C_{12}$ radical having 1 to 3 heteroatoms from the series oxygen, sulphur and nitrogen, for example (i) diisocyanates such as ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and 1,4-diisocyanate and also any desired mixtures of these isomers, 1-isocyanato-2-isocyanatomethyl-cyclopentane, 1-isocyanato-3,3,5-trimethyl-5-isocyanatomethyl-cyclohexane, 2,4- and 2,6-hexahydrotolylene diisocyanate and also any desired mixture of these isomers, hexahydro-1,3- and/or -1,4-phenylene diisocyanate, perhydro-2,4'- and/or -4,4'-diphenylmethyl diisocyanate, 1,3- and 1,4-phenylene diisocyanate, 2,4- and 2,6-tolylene diisocyanate and also any desired mixtures of these isomers, diphenylmethane 2,4'- and/or 4,4'-diisocyanate, naphthalene 1,5-diisocyanate, uretdione-functional polyisocyanates such as, for example, bis(6-isocyanatohexyl) uretdione or the dimer—containing the uretdione structure—of 1-isocyanato-3,3,5-trimethyl-5-isocyanatomethylcyclohexane, and any desired mixtures of the abovementioned polyisocyanates; (ii) trifunctional and more highly functional polyisocyanates, such as the isomers of the triisocyanatotriphenylmethane series (such as triphenylmethane 4,4',4''-triisocyanate) and their mixtures; (iii) compounds prepared from the polyisocyanates (i) and/or (ii) by allophanatization, trimerization or biuretization and having at least 3 isocyanate groups per molecule. Examples of polyisocyanates prepared by trimerization are the trimer, obtainable by isocyanate formation, of 1-isocyanato-3,3,5-trimethyl-5-isocyanatomethylcyclohexane and the isocyanurate-functional polyisocyanates which are obtainable by trimerization of hexamethylene diisocyanate alone or in a mixture with 2,4'-diisocyanatotoluene. Examples of polyisocyanates prepared by biuretization are tris (isocyanatohexyl) biuret and its mixtures with its higher homologues, as are accessible, for example, in accordance with DE-A 23 08 015.

Particularly preferred polyisocyanates A) are those having a molecular weight of from 140 to 400 and having NCO groups attached to aliphatic or cycloaliphatic structures, such as, for example, 1,4-diisocyanatobutane, 1,6-diisocyanatohexane, 1,5-diisocyanato-2,2-dimethylpentane, 2,2,4- and 2,4,4-trimethyl-1,6-diisocyanato-hexane, 1,3-and 1,4-diisocyanatohexane, 1-isocyanato-3,3,5-trimethyl-5-isocyanato-methyl-cyclohexane, 1-isocyanato-1-methyl-4-isocyanatomethyl-cyclohexane and 4,4'-diisocyanatodicyclohexyl-methane, and any desired mixtures of such diisocyanates. Araliphatic polyisocyanates as well, such as the xylylene diisocyanates of the formulae

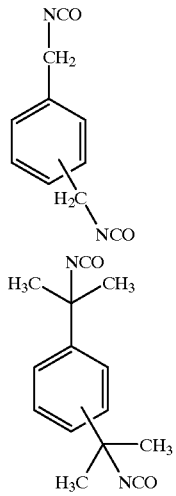

can be used.

Preference is given to the use of the above diisocyanates. However, it is also possible at the same time to use monofunctional aliphatic isocyanates such as, for example, butyl isocyanate, hexyl isocyanate, cyclohexyl isocyanate, stearyl isocyanate or dodecyl isocyanate and/or polyisocyanates having an average functionality of from 2.2 to 4.2.

The more highly functional polyisocyanates are preferably polyisocyanate mixtures containing isocyanate groups and optionally uretdione groups and consisting of trimeric 1,6-diisocyanatohexane or 1-isocyanato-3,3,5-trimethyl-5-isocyanatomethyl-cyclohexane and, if desired, dimeric 1,6-dilsocyanatohexane or 1-isocyanato-3,3,5-trimethyl-5-isocyanatomethyl-cyclohexane and the correspondingly higher homologues, and having an NCO content of from 19 to 24% by weight, as are obtained by conventional catalytic trimerization, and with isocyanurate formation, of 1,6-diisocyanatohexane or 1-isocyanato-3,3,5-trimethyl-5-isocyanatomethyl-cyclo-hexane, and preferably having a (mean) NCO functionality of from 3.2 to 4.2.

Other suitable polyisocyanates A are polyisocyanates which are prepared by modifying aliphatic or cycloaliphatic diisocyanates and have a uretdione and/or an isocyanurate, urethane and/or allophanate, biuret or oxadiazine structure, as are described by way of example in, for example, DE-A 1 670 666, 3 700 209 and 3 900 053 and in EP 336 205 and 339 396. Other examples of suitable polyisocyanates are the polyisocyanates which contain ester groups, for example the tetrakis-isocyanates or triisocyanates obtainable by reacting pentaerythritol silyl ethers or trimethylolpropane silyl ethers with isocyanatocaproyl chloride (cf. DE-A 3 743 782). Furthermore, it is also possible to use triisocyanates such as, for example, tris-isocyanatodicyclohexylmethane.

The use of monofunctional isocyanates and of more than difunctional isocyanates is in both cases preferably restricted to amounts of at most 10 mol-% each, based on all polyisocyanates A.

However, very particular preference is given to the above-mentioned aliphatic, cycloaliphatic and araliphatic diisocyanates.

The polyether alcohols B are accessible in a manner known per se by alkoxylating appropriate starter molecules. To prepare the polyether alcohols it is possible to employ any desired monohydric or polyhydric alcohols with molecular weights from 32 to 250 as starter molecules. As starter molecules it is preferred to use monofunctional aliphatic $C_1$–$C_{18}$-, preferably $C_1$–$C_4$-alcohols. Particular preference is given to the use of methanol, butanol, ethylene glycol monomethyl ether or ethylene glycol monobutyl ether as starter.

Alkylene oxides which are particularly suitable for the alkoxylation reaction are ethylene oxide and propylene oxide, which can be employed in any desired sequence in the course of the alkoxylation reaction. Any other epoxides desired, such as butylene oxide, dodecene oxide or styrene oxide, for example, can also be used at the same time. Pure polyethylene oxide alcohols are particularly preferred.

Polyalkylene oxide alcohols containing ester groups can also be used at the same time. Suitable polyalkylene oxide alcohols containing ester groups are OH-terminated polyester ethers which are obtainable by reacting aliphatic $C_2$–$C_8$-dicarboxylic acids or their esters or acid chlorides with polyethers from the group of the polyethylene oxides, polypropylene oxides, mixtures thereof or mixed polyethers, using from 0.8 to 0.99 equivalents of carboxyl groups or derivatives thereof per OH equivalent of the polyether, and which have a mean molecular weight of below 10,000, preferably below 3000.

The NCO-reactive components C which are optionally used at the same time comprise customary mono- to tetrafunctional building blocks used in polyurethane chemistry, such as alcohols, amines, amino alcohols and mercaptans having molecular weights below 6000, preferably below 2000, such as, for example, polyesters, polyether esters and polycarbonates, provided that they do not come under the definition B.

Preferred components C are long-chain, optionally branched, so-called fatty alcohols or fatty amines with 12 to 30 carbon atoms, which have an "oiling" or "re-oiling" action, and also OH-containing esters of natural fatty acids such as stearic, oleic, palmitic, linoleic and linolenic acid, etc.

Very particularly preferred components C are OH-containing natural fats and oils such as castor oil, for example.

The products I b) of the reaction of components A to D can comprise up to 20% by weight of incorporated radicals of component C.

Preferred blocking agents D are preferably the sodium salts of sulphurous and disulphurous acid, i.e. sodium hydrogen sulphite ($NaHSO_3$) and sodium disulphite ($Na_2S_2O_5$), respectively.

It is also possible with advantage to use the other alkali metal and ammonium salts of these acids, namely potassium bisulphite, potassium disulphite, lithium bisulphite, lithium disulphite, ammonium bisulphite, ammonium disulphite and also simple tetraalkylammonium salts of these acids, such as, for example, tetramethyl-ammonium bisulphite, tetraethylammonium bisulphite, etc. For blocking, the salts are preferably employed as aqueous solutions with solids contents of from 5 to 40% by weight.

The reaction products I b) can be prepared, for example, as follows:

In a first step, the polyisocyanate A is reacted with polyether alcohol B until all of the OH groups have been urethanized. The resulting NCO-terminal prepolymer is then blocked, in a second step, with alkali metal or ammonium bisulphite or disulphite until all of the NCO groups have reacted.

With particular preference the overall process is carried out without solvent as a one-pot process. The 1st step of the reaction is carried out in the temperature range up to 130° C., preferably in the range between 50° C. and 120° C. and, with particular preference, at between 80° C. and 110° C. The reaction can be monitored by titration of the NCO content or by measurement of the IR spectra and evaluation of the carbonyl band at about 2100 $cm^{-1}$ and is over when the isocyanate content is not more than 0.1% by weight above the value which is intended to be reached on complete conversion. In general, reaction times of less than 4 hours are sufficient.

Through the simultaneous use of catalysts such as dibutyltin dilaurate, tin(II) octoate or 1,4-diazabicyclo[2.2.2] octane in amounts from 10 to 1000 ppm, based on the reaction components, it is possible to accelerate the reaction. The resulting NCO prepolymers, with NCO contents of from 5 to 45% by weight, are then, in a 2nd step, reacted at from 0 to 60° C., preferably at from 10 to 40° C., with aqueous solutions of alkali metal or ammonium sulphites and water until all of the NCO groups have reacted. This generally requires reaction times of from 1 to 12 hours, preferably from 3 to 8 hours. The end products are visually clear aqueous solutions or, in a few individual cases, are stable, finely particulate emulsions having a mean particle diameter of below 8000 nanometers. It may be advantageous first to react the NCO prepolymers with from 20 to 50% strength by weight aqueous solutions of the alkali metal or ammonium bisulphites or disulphites and, after from 5 to 45 minutes, to add the rest of the water, so as to end up then with a solids content of the aqueous formulations of from 10 to 50% by weight, preferably from 25 to 40% by weight.

In order to achieve the tanning effect it is necessary to carry out basification; in other words, the pH should be from at least 7.5 to preferably not more than 9.5. Under these conditions the capped isocyanate groups react, with crosslinking of the collagen (and simultaneous elimination of the bisulphite group).

The reaction products I b) can be basified using all known basifying agents which are customary in tanning:

sodium carbonate and hydrogen carbonate, magnesium oxide, dolomite, tertiary amines, etc. The controlled addition of sodium hydroxide or potassium hydroxide, moreover, is generally possible (but uncommon). Particular preference is given to magnesium oxide.

In the case of tanning with the reaction products I b) there is no need for the low pH which is customary in the case of mineral tanning. By this means it is possible to do without addition of salt (pickle). For example, pelts are delimed to a pH of from 5 to 8 (preferably around 7), the reaction product I b) is added, and basification is commenced after a running time of one hour. (In the case of calcined magnesium oxide the addition can be commenced immediately.) Depending on the mechanical drumming effect and thickness and on the digestion (e.g. enzymatic) of the pelt, tanning and, preferably, the basification which takes place at the same time can be over in from 4 to 6 hours. In general, however, as is conventional in chrome tanning, the process is allowed to continue overnight after the initial run of 1 hour and following the addition of the basifying agent in a further two steps (in each case after a running time of 1 hour), then rinsing is carried out the next morning and operation continues in the customary manner.

In general, amounts of from 1 to 20, preferably from 3 to 15% by weight of reaction product I b) are used, based on pelt weight. In this case, the leathers tanned with the reaction product, with shrinkage temperatures of more than 70° C., preferably more than 75° C., serve as the initial stage (analogous to wet blue) for retanning.

Bisulphite-blocked polyisocyanates I b) of the type described are known from DE-A 4 422 569.

The use of the bisulphite-blocked polyisocyanates described which contain polyethylene oxide groups has performance advantages which lie in the obtention of residual tanning liquors that are free from heavy metal ions. The leather shrinkage temperatures which can achieved with these products are more than 70° C., in most cases more than 80° C., and are therefore within the range of shrinkage temperatures required for the majority of leather types.

The term "polyaspartic acid" II a) as used below includes its salts, preferably its ammonium, potassium and sodium salts, and its anhydrides, such as polysuccinimide, and copolymers obtained by partial dehydration and containing not only the succinimide units but also aspartic acid units. Polysuccinimide is able to form polyaspartic acid during use, as a result of hydrolysis. The preparation of polyaspartic acid and its derivatives has long been the subject of numerous publications. For instance, it can be prepared by thermal polycondensation 6of aspartic acid (J. Org. Chem. 26, 1084 (1961)); cf. also DE-A 2 253 190, U.S. Pat. No. 4,696,981, 5,296,578 and 5,288,783.

U.S. Pat. No. 4,839,461 (=EP-A 256 366) describes the preparation of polyaspartic acid from maleic anhydride, water and ammonia. Accordingly, maleic anhydride is converted to the monoammonium salt in an aqueous medium with the addition a of concentrated ammonia solution. This maleic acid monoammonium salt can be subjected to continuous or discontinuous thermal polymerization in a reactor, preferably at 150 to 180° C., for a residence time of from 5 to 300 minutes, and the resulting polysuccinimide can be reacted by hydrolysis to give polyaspartic acid or a salt thereof.

The polyaspartic acid II(a) comprises, in a preferred embodiment, essentially repeating units of the following structure;

a) 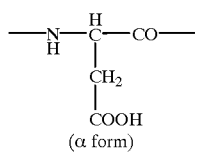
(α form)

and b) 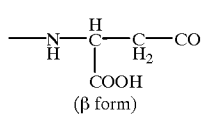
(β form)

In general, the proportion of the β form is more than 50%, in particular more than 70%, based on the sum a+b.

In addition to the repeating aspartic acid units a) and b) it is possible for further repeating units to be present, for example c) malic acid units of the formula

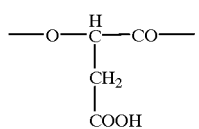

-continued

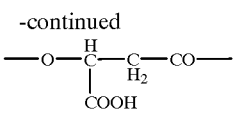

d) maleic acid units of the formula

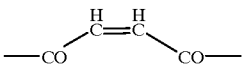

e) fumaric acid units of the formula

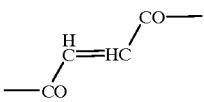

The "further" repeating units can be present in amounts of up to 100% by weight, based on the sum a+b, in the polyaspartic acid.

Preferred polyaspartic acids II a) possess molecular weights, determined as the weight average by gel permeation chromatography (calibrated with polystyrene), of from 500 to 10,000, preferably from 1000 to 5000 and, in particular, from 2000 to 4000.

The polyaspartic acid II a) can be employed in amounts of from 0.1 to 20, preferably from 0.5 to 12, in particular from 1 to 8% by weight (based on pelt weight in the case of tanning or on shaved weight in the case of retanning).

In both tanning and retanning the polyaspartic acid can be used in combination with other tanning agents, preferably in a weight ratio of from 1:9 to 9:1. Examples of other tanning agents are vegetable tanning agents and synthetic organic tanning agents (so-called "syntans") including the resin tanning agents. Examples of other such tanning agents are described in the following literature: F. Schade and H. Tr äubel, "Neuere Entwicklungen auf dem Gebiet der synthetischen organischen Gerbstoffe" [Recent developments in the field of synthetic organic tanning agents], Das Leder 33 (1982), 142–154; H. Traubel and K. -H. Rogge, "Retannage and Retanning Materials", JALCA 83 (1988), 193–205; K. Faber, "Gerbmittel, Gerbung und Nachgerbung" [Tanning agents, tannage and retannage], Vol. 3 in H. Herfeld, Bibliothek des Leders, Frankfurt 1984; EP-A 118 023, 372 746, DE-A 3 931 039.

The polyaspartic acid is usually employed directly before dyeing.

The use of polyaspartic acid will be explained below:

Shaved pretanned leather (wet blue) is neutralized in a drum after brief washing; in the course of neutralization a pH range from 4.5 to 5 is reached. This neutralization liquor is then drained, 100% by weight (based on the shaved weight of the leather) of water at from 30 to 50° C. is added, followed by from 2 to 5% by weight of polyaspartic acid or derivatives thereof, the batch is left to run for 2 hours, and then dyeing is carried out.

Polyaspartic acid and its use as a tanning agent are known from DE-A 4 439 990.

Preferred polyaspartamides II b) are products having a number-average molecular weight of from 700 to 30,000, preferably from 1300 to 16,000, obtainable by reacting A. polysuccinimide having a number-average molecular weight of from 500 to 10,000. preferably from 500 to 6000, in particular from 1000 to 4000, with B. from 5 to 90, preferably from 20 to 80 mol-%, based on succinimide units of the polysuccinimide A, of primary and/or secondary amine whose nitrogen substituents contain 1 to 60, preferably 1 to 36 carbon atoms, can be substituted by fluorine atoms, hydroxyl groups, amino groups and/or organosilicon radicals and/or can be interrupted by oxygen atoms or ester, amide, urea or urethane groups, where at least 2.5, preferably at least 1.5 and, in particular, at least 30 mol-% of the nitrogen substituents of the amine contain at least 12 carbon atoms, and, if desired, C. (i) derivatives of $C_1$–$C_{18}$-monocarboxylic acids and/or $C_2$–$C_{10}$-dicarboxylic acids and/or (ii) monoisocyanates, diisocyanates or epichlorohydrin (for reaction of amino and/or hydroxyl groups and the nitrogen substituents of the reaction product A and B), and (obligatorily)

D. from 95 to 10, preferably from 80 to 20, mol-% of ring-opening base in the presence of water.

The polysiccinimide A which serves as starting material for the polyaspartamides II b) which are to be used in accordance with the invention is known. It can be prepared from aspartic acid with elimination of water; cf. J. Org. Chem. 26 (1961) 1084; FR 70 24 831; P. Neri in J. Med. Chem. 16 (1973), 893; U.S. Pat. No. 4,363,797.

Other methods start from maleic acid or its anhydride and ammonia (DE-A 4 305 368; U.S. Pat. No. 4,839,461). Thus polysuccinimide, for example, can be prepared by reacting from 80 to 100 mol-% of maleic acid and from 20 to 0 mol-% of succinic anhydride (as chain terminator) with ammonia, with removal of the water of reaction at elevated temperature, generally at from 85 to 240° C., preferably from 120 to 180° C.

U.S. Pat. No. 4,839,461 (=EP-A 256 366) describes the preparation of polyaspartic acid from maleic anhydride, water and ammonia. Accordingly, maleic anhydride is converted to the monoammonium salt in an aqueous medium with the addition of concentrated ammonia solution. This maleic acid monoammonium salt can be subjected to continuous or discontinuous thermal polycondensation in a reactor, preferably at 150 to 180° C., for a residence time of from 5 to 300 minutes to give polysuccinamide.

The polysuccinimide A which is used as starting compound can also be prepared by dehydration from polyaspartic acid or by thermal polycondensation from aspartic acid.

The dehydration of aspartic or polyaspartic acid to give polysuccinimide can be carried out at elevated temperature, preferably at from 100 to 240° C., in the presence or absence of a catalyst, for example in the presence of from 0.01 to 1% by weight, based on polyaspartic acid, of an acidic catalyst such as sulphuric, phosphoric or methanesulphonic acid.

Preferred amines B comprise secondary and— preferably—primary amines, such as, for example, monofunctional polyetheramines having a primary or secondary amino group, such as α-methyl-ω-amino-polyoxyethylene, α-methyl-ω-aminopropyl-triethoxysilane, aminopropyl-trimethoxy-silane, am inopropyl-heptamethyl-trisiloxane, N-2-aminoethyl-aminopropyl-dimethyl-ethoxy-silane, N-2-aminoethyl-aminopropyl-methyl-dimethoxy-30 silane, perfluorohexyl-ethylamine, N-aminoethyl-N-methyl-perfluoro-octylsulphonamide, N,N-dimethylethylenediamine, methylamine, diethylamine, butylamine, stearylamine, tallow fatty amine, oleylamine, undecylamine, dodecylamine, octylamine, hexylamine, eicosanylamine, hexadecylamine, 2-ethyl-hexylamine, morpholine, ethanolamine, diethanolamine, bis-2-hydroxy-propylamine, bis-3-hydroxy-propylamine, 2- or 3-hydroxypropylamine, ethoxy-ethylamine, ethoxy-ethoxy-ethylamine, butoxy-ethoxy-5 ethoxy-ethylaminie, 2-methoxy-ethyl-amine, tetrahydrofurfurylamine, 5-aminopentanol, benzylamine, 4-aminocyclohexylamine, taurine Na salt, glycine methyl ester, N-methyl-aminoethyl-sulphonic acid Na salt, dehydroabietylamine, stearyloxypropylamine,

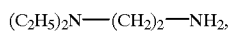

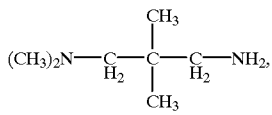

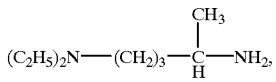

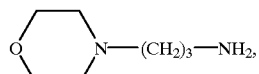

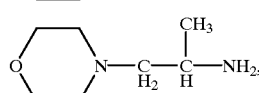

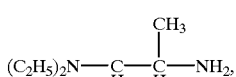

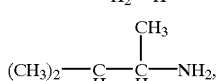

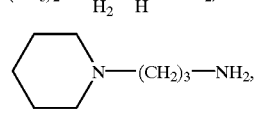

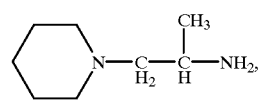

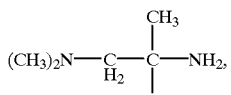

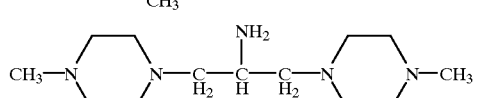

or mixtures thereof.

The reaction of polysuccinimide with amines is known in principle; cf. e.g. DE-A 2 253 190, EP-A 274 127, 406 623 and 519 119, U.S. Pat. Nos. 3,846,380, 3,927,204 and 4,363,797; P. Neri et al., Macromol. Syntheses 8, 25. The reaction, although it can be formed in excess amine B, is preferably carried out in organic solvents which are inert under reaction conditions. Examples of suitable such solvents are lactams such as caprolactam, pyrrolidone, N-methylpyrrolidone, N-methylcaprolactam, polyalkylenediols and their mono- and diethers, such as ethylene glycol, diethylene glycol, triethylene glycol, ethylene glycol dimethyl ether and diethyl ether and diethylene glycol monoethyl ether, and also dimethylformamide and dimethyl sulphoxide. The solvent content will generally not exceed 30% by weight based on the overall reaction mixture.

The reaction mixture can, albeit not preferably, comprise water or paraffins. The reaction is carried out in a temperature range from 20 to 160° C., the reaction times being between 2 to 72 hours. The product can be isolated by distillative removal of the solvent or by precipitation of the product in a non-solvent such as acetone, methanol, ethanol, water or isopropanol and can subsequently, if desired, be dried. It is also possible to disperse the reaction mixture in the water phase without further purification steps.

From the reaction product of A and B, the polyaspartamides II b) can be prepared by opening the remaining incorporated succinimide rings. Suitable ring-opening bases C include not only alkali metal hydroxides, carbonates and hydrogen carbonates, especially sodium and potassium hydroxide and sodium carbonate, but also ammonia and amines—including the amines B.

According to one particular embodiment maleic acid and/or maleic anhydride and aqueous ammonia can be mixed in a molar ratio of 0.75 to 1.5 and water can be distilled off. If desired, one of the abovementioned organic solvents can be added to the reaction. When the polysuccinimide has reached the desired molecular weight, amine B is metered in and reaction is carried out at from 130 to 160° C. A reaction time of from 3 to 18, preferably from 4 to 8 hours is generally sufficient for the reaction of the amine B. If desired, an organic solvent can be added. The polyaspartamide II b) is produced directly and can be readily dispersed in water with simultaneous opening of the remaining incorporated succinimide rings using ringopening base D.

In an idealized form, the polyaspartamides to be used in accordance with the invention comprise repeating structural units of the formulae

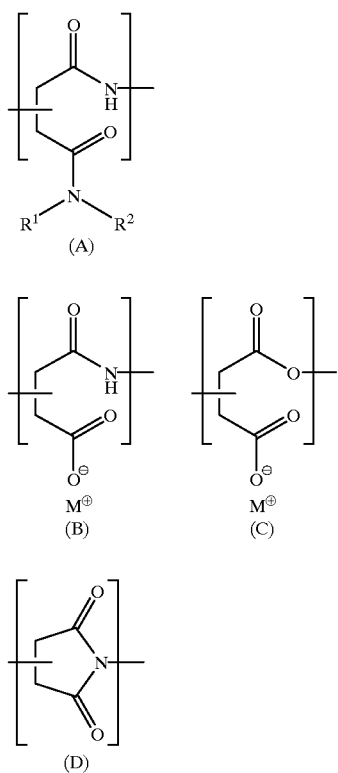

in which
R$^1$ and R$^2$ are hydrogen or one of the radicals designated above as nitrogen substituents, with the proviso that at least one of the two radicals is not hydrogen, and M$^+$ is H$^+$ or an alkali metal ion, an NH$_4$ ion or a primary, secondary or tertiary aliphatic ammonium radical which preferably carries at least one C$_1$–C$_{22}$-alkyl or -hydroxyalkyl group.

Examples of suitable radicals M$^+$ are hydroxyethylammonium, dihydroxy-ethyl-ammonium, trishydroxyethylammonium, triethylammonium, ammonium, butyl-ammonium, benzyltrimethylammonium, morpholinium, stearylammonium and oleylammonium.

The content of the structural units I in the polymer is preferably from 5 to 90, in particular from 20 to 80 mol-%, based on all repeating units. Preferred polyaspartamides contain on average at least one C$_{12}$–C$_{22}$-alkyl and/or -alkylene radical per structural unit I.

The content of the structural units II in the polymer is preferably from 95 to 10, in particular from 80 to 20 mol-%, based on all repeating units. Particular preference is given to polyaspartamides whose carboxyl groups are in partially neutralized form. The preferred degree of neutralization is from 10 to 70, preferably from 20 to 50%. From 0 to 20 mol-% of this is accounted for by the structure IIC, based on the structures II.

The content of the structural units III in the polymer is from 0 to 5 mol-%, based on all repeating units. Preferred polyaspartamides contain less than 1 mol-% of the structural units III.

Where polysuccinimide A has been prepared from polyaspartic acid containing the abovementioned repeating units C), the carboxyl groups of these repeating units can also be in amidated form.

Suitable nitrogen substituents R$^1$ and R$^2$ comprise, independently of one another, for example, unsubstituted or hydroxyl-substituted C$_1$–C$_{22}$-alkyl or C$_2$–C$_{22}$-alkenyl groups of hydroxyethyl, hydroxypropyl, methyl, ethyl, butyl, hexyl, octyl, octenyl, decyl, undecyl, undecenyl, dodecyl, tetradecyl, hexadecyl, oleyl, octadecyl, 12-hydroxy-octadecenyl, C$_5$–C$_{10}$-cycloalkyl radicals such as cyclohexyl, C$_{12}$–C$_{30}$ radicals interrupted by oxygen atoms or by ester, amide or urethane groups, such as stearoyloxyethyl, stearyloxyethoxyethyl and stearylcarbamoyloxyethyl, and also radicals of the formulae

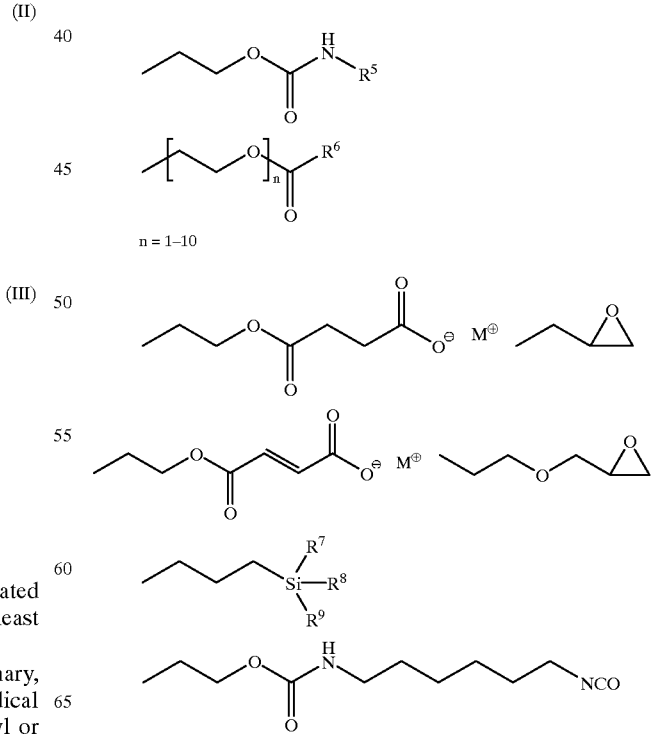

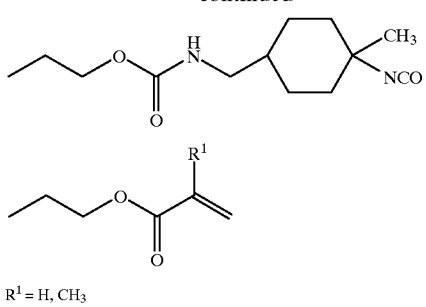

R¹ = H, CH₃ in which
R⁵ and R⁶ are $C_1$–$C_{30}$-alkyl, $C_2$–$C_{30}$-alkenyl or $C_5$–$C_{10}$-cycloalkenyl,
R⁷ to R⁹ are $C_1$–$C_4$-alkyl or -alkoxy, and
M⁻ has the meaning indicated above.

Nitrogen substituents interrupted by oxygen atoms or by ester, amide or urethane groups can in principle be. formed either by using amines B which already contain these groups or, subsequently, by reacting initially introduced reactive nitrogen substituents with appropriate co-reactants.

Amide and ester groups can be introduced, for example, by subsequent reaction of already introduced aminoalkyl and/or hydroxyalkyl radicals with reactive carboxylic acid derivatives, preferably derivatives of $C_1$–$C_{18}$-monocarboxylic acids or $C_2$–$C_{10}$-dicarboxylic acids, such as anhydrides or chlorides, examples being acetic anhydride, acetyl chloride, acryloyl and methacryloyl chloride, methacrylic anhydride, succinic anhydride, maleic anhydride, stearoyl chloride and phthalic anhydride.

Urethane groups and urea groups can be introduced, for example, by subsequent reaction of already introduced amino or hydroxyalkyl radicals with mono- or diisocyanates such as butyl isocyanate, stearyl isocyanate, hexamethytene diisocyanate, totylene diisocyanate, isophorone diisocyanate and 1-isocyanatomethyl-4-methyl-4-cyclohexyl isocyanate. Monoisocyanates are particularly preferred. Crosslinked products are not preferred.

Nitrogen substituents interrupted by nitrogen atoms are best introduced by using corresponding amino ethers B.

Epoxy groups can be introduced, for example, by subsequent epoxidation of already introduced alkenyl groups, for example with per-acids. Another possibility is alkylation with epichlorohydrin.

The polyaspartamides II b) are very often self-dispersing, especially when the proportion of the structural units I is below 50 mol-%. However, it is also possible to use external dispersants; suitable such dispersants are, in principle, cationic, anionic and nonionic dispersants as are described, for example, in "Methoden der organischen Chemie" [Methods of organic chemistry] (Houben-Weyl), 4th edition, volume XIV/1, Georg Thieme Verlag, Stuttgart 1961, p. 190 f.

Preferred dispersants comprise, for example, $C_8$–$C_{18}$-n-alkyl sulphates, $C_8$–$C_{18}$-n-alkyl-benzenesulphonates, $C_8$–$C_{18}$-n-alkyl-trimethyl-ammonium salts, n-di-$C_8$–$C_{18}$-n-alkyl-dimethyl-ammonium salts, $C_8$–$C_{18}$-n-alkyl carboxylates, $C_8$–$C_{18}$-n-alkyl-dimethylamine oxides, $C_8$–$C_{18}$-n-alkyl-dimethylphosphine oxides and—preferably—oligoethylene glycol mono-$C_6$–$C_{18}$-alkyl ethers having on average from 2 to 30 ethoxy groups per molecule. The n-alkyl radicals can also be replaced by partially unsaturated linear aliphatic radicals. Particularly preferred dispersants are oligoethylene glycol mono-$C_{10}$–$C_{14}$-alkyl ethers having on average from 4 to 12 ethoxy groups per molecule, especially oligoethylene glycol mono-$C_{12}$-alkyl ethers having an average 8 ethoxy groups per molecule.

Preferred dispersants comprise, furthermore, oleic acid, oleic acid sarcosides, ricinoleic acid, stearic acid, fatty acid partial esters of polyols such as glycerol, trimethylolpropane or pentaerythritol and the acylation, ethoxylation and propoxylation products thereof, for example glycerol monostearate and monooleate, sorbitan monostearate and monooleate, sorbitan tristearate and trioleate and the reaction products thereof with dicarboxylic anhydrides such as succinic, maleic, phthalic or tetrahydrophthalic anhydride, reaction products of bis(hydroxymethyl)tricyclodecane and maleic anhydride or succinic anhydride and derivatives thereof, preferably in the form of their alkali metal salts or ammonium salts.

Particularly preferred dispersants are salts of long-chain fatty acids, preferably oleic acid, and an amino alcohol, preferably hydroxyethylamine, bishydroxyethylamine or trishydroxyethylamine.

The dispersion of the polyaspartamides II b) can be prepared such that the polyaspartamides are dispersed in an aqueous dispersant solution with stirring, preferably with heating at temperatures from 40 to 95° C.

A general recommendation is to disperse the polyaspartamides II b) directly from the reaction mixture, which may contain organic solvents, without isolating them beforehand. Thus it is possible, for example, to meter an aqueous dispersant solution into the reaction mixture, with stirring, at temperatures from 70 to 130° C., to give a mixing temperature of from 70 to 95° C., and to distil off the organic solvent.

Conversely, of course, the reaction mixture can also be dispersed in aqueous dispersant solution, or a mixture of reaction mixture and dispersant can be dispersed in water. It is also possible to omit the removal of solvent; in this case, however, the solvent content of the dispersion should not exceed 10% by weight.

The dispersion content is generally not more than 30, preferably from 3 to 15% by weight, based on the finished dispersion.

The solids content of the dispersions can be from 5 to 70% by weight. The mean particle size of the dispersed polyaspartamides is in general from 100 to 1000, preferably from 100 to 700 and, in particular, from 100 to 400 nm.

In order to facilitate the penetration of the assistants into the leather it may be desirable to reduce the particle size of the disperse phase. For this purpose the pre-emulsion already obtained can be subjected to aftertreatment under a high shear gradient in known dissolvers, dispersing machines, such as in a jet disperser, or mixers operating in accordance with the rotor-stator principle, or high-pressure homogenizers. The period of dispersion can be between a few minutes and up to 4 hours. Dispersing preferably takes place within a temperature range between 20 and 75° C. The pressure in dispersing machines can be from 2 to 2500 bar.

Especially at solids contents above 40% by weight, the dispersions can be in the form of pastes which can nevertheless readily be diluted with water. The dispersions having a solids content of below 40% by weight are in the from of pourable emulsions or microemulsions. The pH of the emulsions or pastes, respectively, is between 4.5 and 12, preferably in the pH range between 4.5 and 10.

Leather treatment can take place with an aqueous liquor which comprises the polyaspartamides II b).

For this purpose the leather is brought into contact with the liquor by application by means of rollers or in a container, preferably in a tanning drum. After the treatment, the leather is dried.

The individual process steps will be illustrated using the following, example:

1. Neutralization of the tanned leather
2. Washing
3. For Addition of the liquor compris ing polyaspartamides III
4. Reduction of the pH by add ing a carboxylic acid to pH values <4.5, preferably from 3.0 to 4.5
5. Washing
6. Drying.

The above polyaspartamides II b) and their use as leather assistants are described in DE-A 195 28 782.

Preferred polyurethanes III a) and III b) (below, for simplicity: "ifi") are described, for example, in EP-A 572 256 and 593 975, in DE-A 20 35 732 and 26 51 506 and in DE-C 4 319 439. Particularly preferred polyurethanes III are polyurethanes containing urea groups which are obtainable in accordance with known methods, observing a ratio of equivalents of isocyanate groups to isocyanate-reactive groups of from 1:1 to 2:1, from a) a diisocyanate component consisting of
   a1) hexamethylene diisocyanate or
   a2) mixtures of hexamethylene diisocyanate with in total up to 60% by weight, based on the mixture, of 1-isocyanato-3,3,5-trimethyl-5-isocyanatomethyl-cyclohexane and/or 4,4'-diisocyanato-dicyclohexyl-methane and/or 1-methyl-2,4(6)-diisocyanatocyclohexane with
b) a diol component consisting of
   b1) at least one polyester diol having a molecular weight, calculable from the hydroxyl group content, of from 500 to 10,000 and formed from (i) adipic acid and/or succinic acid and (ii) at least one alkanediol having 2 to 6 carbon atoms, or
   b2) a mixture of such polyester diols with up to 32% by weight, based on the overall weight of component b), of alkanediols which have 2 to 6 carbon atoms and may contain ether groups,
c) a diamine component in an amount of from 2 to 50 equivalent%, based on the overall amount of the isocyanate-reactive groups present in components b) and c), consisting of
   c1) diamino sulphonates of the general formula $H_2N-(-CH_2)_n-NH-(-CH_2)_m-SO_3Me$ or
   c2) mixtures of diamino sulphonates c1) with up to 70% by weight, based on the overall weight of component c), of ethylenediamine, optionally
d) hydrophilic polyether alcohols of the general formula $H-X-O-R$ in an amount of up to 10% by weight, based on the overall weight of components b), c) and d), and optionally
e) water, which is not included in the calculation of the ratio equivalent of isocyanate groups to isocyanate-reactive groups, where, in the abovementioned general formulae,

| | |
|---|---|
| m and n | independently of one another are numbers from 2 to 6, |
| Me | represents potassium or sodium, |
| R | represents a monovalent hydrocarbon radical having 1 to 12 carbon atoms, and |
| X | is a polyalkylene oxide chain of the molecular weight range from 88 to 4000 at least 40% whose alkylene oxide units consist of ethylene oxide units and the remainder of propylene oxide units. |

The diisocyanate component a) preferably consists exclusively of hexamethylene diisocyanate.

The diol component b) consists either of b 1) at least one polyesterdiol or b2) a mixture of at least one polyesterdiol b1) with up to 32, preferably up to 10% by weight of at least one alkanediol which has 2 to 6 carbon atoms and may contain ether groups.

Suitable polyesterdiols b1) are those having a molecular weight, calculable from the hydroxyl group content, of from 500 to 10,000, preferably from 1000 to 2500, and based on (i) adipic acid and/or succinic acid and (ii) alkanediols which have 2 to 6 carbon atoms and which may contain ether groups, such as, for example, ethylene glycol, diethylene glycol, 1,4-butanediol, neopentyl glycol and/or 1,6-hexanediol.

Polyester diols in whose preparation exclusively ethylene glycol and/or 1,4-butanediol have been employed as the diol are particularly preferred.

The alkanediols which have 2 to 6 carbon atoms and which may contain ether groups, and which are to-be used, if desired, as hydroxyl-containing chain extenders are those of the type just mentioned by way of example.

The diamine component c) consists either of c1) diamino sulphonates of the general formula already mentioned above or of c2) mixtures of such diamino sulphonates with ethylenediamine which is employed, if at all, in amounts of up to 90, preferably up to 70 equivalent %, based on the isocyanate-reactive amino groups of component c). Very particularly preferred diamino sulphonates are the potassium or sodium salts of N-(2-aminoethyl)-2-aminoethanesulfonic acid.

The diamine component c) is generally used in an amount of from 1 to 10, preferably from 2 to 5% by weight, based on the weight of component b).

The structural component d) whose additional use is an option comprises hydrophilic monofunctional polyether alcohols of the general formula $H-X-O-R$ in which
   R and X have the meaning already given above.
   Preference is given to those such polyether alcohols for which
   R represents an aliphatic hydrocarbon radical having 1 to 4 carbon atoms and
   X represents a polyalkylene oxide chain of the molecular weight range from 500 to 4000 in which at least 40, in particular at least 70 and, with particular preference, 100% of the alkylene oxide units present are ethylene oxide units and the remaining alkylene oxide units are propylene oxide units.

The preparation of such monofunctional polyether alcohols takes place by conventional alkoxylation of suitable starter molecules R—OH such as, for example, methanol, n-butanol, n-hexanol or n-dodecanol, preferably with the use of ethylene oxide and, if desired, propylene oxide, in proportions of the alkylene oxides which correspond to the comments made above. In this context, the abovementioned alkylene oxides can be employed as a mixture and/or in succession.

The monofunctional polyether alcohols d) are employed, if at all, in amounts of up to 10, preferably up to 3% by weight, based on the overall weight of components b), c) and d).

As a further structural component which may come into consideration in the preparation of the polyurethanes III which contain urea groups mention may be made of e), water, which should be taken into consideration as a reactant especially when, in the course of the preparation of polyurethanes, the chain extension reaction of previously prepared NCO prepolymers, carried out in the last stage, takes place in an aqueous medium, in particular when the diamines c) dissolved in the water are employed in less than equivalent amounts relative to the NCO groups of the NCO prepolymers.

In addition to these structural components suitability extends in principle to trifunctional compounds, in minor amounts, such as, for example, glycerol or trimethylolpropane, which can either be incorporated in small amounts into the polyester b1) or be employed in free form as part of component b2). The concomitant use of such branching molecules must generally be compensated by monofunctional compounds so as to end up with linear polymers again, in terms purely of calculation.

The preparation of the polyurethanes III containing urea groups from the structural components mentioned by way of example can take place by any desired techniques of the prior art. Preferably, however, use is made of the known prepolymer technique, and specifically such that an NCO prepolymner or semiprepolymer is prepared from the components b) and, if used, d) and from the diisocyanate component a), while observing a ratio of NCO/OH equivalents of from 1.5:1 to 4:1, preferably from 1.8:1 to 2.5:1, and the said prepolymer or semiprepolymer is subsequently reacted with component c), with extension of the chain.

In this context, the prepolymer or semiprepolyrner is generally prepared without solvent at temperatures from 20 to 150° C. and is then dissolved in an appropriate solvent. It is also possible, of course, for the formation of the prepolymers or semiprepolymers to take place directly in a solvent. Particularly suitable solvents are solvents which are inert with respect to isocyanate groups and are of unlimited miscibility with water. Acetone is preferably used as solvent.

The prepolymers or semiprepolymers thus prepared are reacted in the second stage with component c), with extension of the chain. In this case the ratio of equivalents of isocyanate groups of the prepolymers or semiprepolyniers, on the one hand, to isocyanate-reactive amino groups of component c), on the other hand, is from 1:1 to 20:1, preferably from 1.2:1 to 4:1. The chain extension reaction can take place in solution, preferably in solution in acetone or else in aqueous medium in such a way that the solution of the prepolymers or semiprepolymers in an organic solvent is combined under conditions of thorough mixing with a solution of component c) in water. As already indicated, this may be accompanied by a chain extension reaction as a result of reaction of the NCO groups of the prepolymers or semiprepolymers with the water. In the case of the abovementioned, preferably 2-stage preparation of the polyurethanes III which contain urea groups, the ratios of equivalents between isocyanate groups and isocyanate-reactive groups of the two reaction stages, within the context of the disclosure made, is chosen so that the overall ratio of isocyanate groups to isocyanate-reactive groups of components b) to d) corresponds to the above-indicated ratio of from 1:1 to 2:1. In no case does the water come into the calculation of the said ratios of equivalents.

The chain extension reaction generally takes place within the temperature range from 20 to 50° C.

As a possibility in principle, but in no way preferred, the chain extension reaction can also take place in the melt, i.e. in the absence of solvents and of water (melt dispersing technique).

The polyurethanes III are preferably applied in the form of aqueous dispersions.

The term "aqueous dispersions" is intended to include aqueous solutions which may be present if the concentration of hydrophilic centres in the polyurethanes which contain urea groups is sufficiently high to ensure solubility in water. Frequently, the dispersions to be used in accordance with the invention comprise aqueous systems containing both dispersed and dissolved urea-functional polyurethanes.

To prepare the aqueous dispersions the starting materials a), b), c) and, if used, d) and/or, if used, e) already mentioned above are employed in the stated proportions.

Such particularly preferred polyurethanes III are known from DE-A 195 17 185.

To prepare the dispersions, the chain-extended polyurethanes III or their solutions in organic solvents, if the chain extension reaction has been carried out in the absence of water, are mixed with the dispersion water, followed if appropriate by the distillative removal of at least part of the auxiliary solvent optionally used. If the chain extension reaction was performed in an aqueous medium, it is possible to add further water, if appropriate, in order to prepare the aqueous dispersions. In this case too, it is of course possible to remove the auxiliary solvent used by distillation, if desired.

In general, the overall amount of water employed is such as to give from 25 to 50% by weight dispersions, based on the dispersed solids on the one hand and the continuous phase on the other hand.

Preferred polyurethanes III are, for example, also known from DE-A 4 421292. These are reaction products a) of at least one glycerol monoester of a saturated $C_{12}$-$C_{18}$-monocarboxylic acid, b) of at least one diisocyanate from the series tolylene diisocyanate, hexamethylene diisocyanate and IPDI (isophorone diisocyanate) and c) dimethylolpropionic acid (=2,2-bis(hydroxyrnethyl) propionic acid), the amounts of components a) to e) being chosen so that the molar ratio of the isocyanate groups of b) to the sum of the hydroxyl groups of a) and c) is from 0.5 to 1.05, preferably from 0.8 to 1.0 and the molar ratio c/a is from 0.7 to 1.5, preferably from 0.8 to 1.2, and the carboxyl groups originating from c) are at least partially neutralized.

These polyurethanes III can be prepared, for example, by reacting the glycerol ester a) with the diusocyanate b) and reacting the resulting addition compound with the diol c). The carboxyl groups of c) can be neutralized before or after the reaction of c).

Examples of suitable neutralizing agents include alkali metal and alkaline earth metal hydroxides, carbonates and hydrogen carbonates, such as sodium hydroxide, potassium hydroxide, sodium carbonate and hydrogen carbonate, potassium carbonate, magnesium, calcium and barium hydroxide, and also ammonia, primary and secondary amines having 1 to 30, preferably 3 to 18 C atoms, such as methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine, oleylamine, dimethylamine, diethylamine, di-n-propylamine, diisopropylamine, di-n-butylamine, diisobutylamine, dihexylamine, dicyclohexylamine, dimethylcyclohexylamine, di-2-ethylhexylamine, di-n-octylamine, diisotridecylamine, di-tallow fatty amine, distearylamine, dioleylamine, ethanolamine, diethanolamine, n-propanolamine, di-n-propanolamine and morpholine.

Preferably at least 50%, in particular at least 80%, of the carboxyl groups originating from c) are neutralized.

The reactions can take place in the absence or presence of organic solvents. Preferred organic solvents are inert for the starting compounds employed and include, for example, acetone, methyl ethyl ketone, tetrahydrofuran, dichloromethane, chloroform, perchloroethylene, ethyl acetate, dimethylformamide, dimethyl sulphoxide and N-methylpyrrolidone.

The reaction of compounds a) and b) can be catalysed by cobalt naphthenate, zinc octoate, preferably dibutyltin dilaurate or dibutyltin diacetate, and by tertiary amines, such as triethylamine or 1,4-diaza[2.2.2]bicyclooctane.

The polyurethanes III can be dispersed in water by adding, for example, the neutralizing agent as an aqueous solution and stripping off any organic solvent present. The polyurethanes III are judiciously employed as aqueous formulations having an ester urethane content of from 1 to 40% by weight in an amount of from 0.2 to 10% by weight, based on shaved weight and polyurethane III solids.

The polyurethanes imi show outstanding exhaustion from the liquor onto the leather and render the leather hydrophobic, soft and firm-grained without adversely affecting the colourability.

Preferred assistants based on natural substances, III a), include casein, albumin, gelatin, protein degradation products, starch, flour, chitosan, gum arabic, cellulose and derivatized (e.g. (partially) esterified) cellulose, lignin derivatives, vegetable tanning agents (where present either in biodegradable form or in a minor amount, so that they do not hinder the breakdown of the leathers), vegetable or animal fats (F. Stather, "Gerbereichemie und Gerbereitechnologie" [Chemistry and technology of tanning], Akademie Verlag Berlin 1967, p. 517 ff.), fatty substances which are oxidized optionally before, during or after tanning, plant-based fillers such as carob flour, guar, etc.

Preferred polyesteramides III b) are known, for example, from U.S. Pat. No. 4,343,931 and 4,529,792 and from JP-A 79 119 593 and 79 119 594. Particularly preferred polyesteramides III b) are polymers comprising aliphatic ester structures and aliphatic amide structures, the proportion by weight of the ester structures being from 30 to 80% and the proportion of the amide structures being from 70 to 20%. They preferably have a mean molecular weight (MC, determined by gel chromatography in m-cresol against polystyrene as standard) of from 10,000 to 300,000, preferably from 20,000 to 150,000.

The starting materials for the preparation of polyesteramides III b) can come from the following groups:

dialcohols such as ethylene glycol, 1,4-butanediol, 1,3-propanediol, 1,6-hexanediol, diethylene glycol
and/or
    dicarboxylic acids such as oxalic acid, succinic acid, adipic acid, etc., as they are and in the form of their respective esters (methyl ester, ethyl ester, etc.)
and/or
    hydroxy carboxylic acids and lactones such as caprolactone
and/or
    amino alcohols such as ethanolamine, propanolamine
and/or
    cyclic lactams such as -caprolactam or laurolactam
and/or
    ω-amino carboxylic acids such as aminocaproic acids
and/or
    mixtures (1:1 salts) of dicarboxylic acids such as adipic acid, succinic acid, etc. and diamines such as hexamethylenediamine, diaminobutane.

It is likewise possible to employ either hydroxyl- or acid-terminated polyesters having molecular weights of between 200 and 10,000 as the ester-forming component. Preferred polyesteramides III b) can contain from 0.01 to 5% by weight, preferably from 0.1 to 2% by weight, based on the sum of all starting components, of branching agents. Preferred branching agents include, for example, trihydric alcohols such as glycerol, trimethylolethane and trimethylolpropane, tetrahydric alcohols such as pentaerythritol, or tribasic carboxylic acids such as citric acid.

Preferred polyesteramides III b) comprise incorporated radicals of divalent aliphatic $C_2$–$C_{12}$-, preferably $C_2$–$C_6$- alcohols, of aliphatic $C_2$–$C_{12}$-, preferably $C_2$–$C_6$- dicarboxylic acids, $C_1$–$C_{12}$-, preferably $C_4$–$C_6$- aminocarboxylic acids or of cyclic lactams having 5–12, preferably 6–11 carbon atoms in the ring.

The polyesteramides III b) can also be prepared with the aid of the 1:1 salt formed from aliphatic dicarboxylic acid and aliphatic diamine, for example the "AH salt" formed from adipic acid and 1,6-hexamethylenediamine.

Preferred polyesteramides III b) comprise 6-aminohexanoic acid radicals as amino carboxylic acid building block.

Polyesteramides III b) formed from -caprolactam, adipic acid and 1,4-butanediol are particularly preferred.

The polyesteramides III b) preferably possess ester contents of from 35 to 65, in particular from 35 to 55% by weight.

The polyesteramides III b) can be synthesized by polymerization of the starting compounds at elevated temperature. The water of reaction can be distilled off during or—preferably—after the reaction (in the latter case optionally together with excess monomers), at atmospheric or reduced pressure. In the course of this reaction the starting compounds are incorporated randomly into the polymer.

The synthesis can take place either by the "polyamide method", by mixing the starting components, with or without the addition of water, and then removing water from the reaction mixture, or by the "polyester method", by adding an excess of diol, with esterification of the acid groups and subsequent transesterification or transamidation of these esters. In this second case, the excess of glycol, as well as water, is distilled off again.

The polycondensation can be accelerated by the use of catalysts. Acceleration of the polycondensation is possible both with the known phosphorus compounds which accelerate polyamide synthesis and with acidic catalysts and salts such as oxides, acetates of Mg, Zn, Ca, etc., for the esterification, and combinations of the two.

The particularly preferred polyesteramides III b) are described, for example, in DE-A 43 27 024.

The leathers prepared in accordance with the invention can be treated with preservatives based on thiocyanatomethylbenzothiazole or pyrocarbonates, for example ethyl pyrocarbonate. In this context the pyrocarbonates are particularly advantageous since they break down, in the presence of water, into the environmentally acceptable components carbon dioxide and ethanol and are no longer a hindrance to subsequent composting.

The invention additionally provides leathers which are at least 30% by weight biodegradable in accordance with DIN 54 900, Part 3 (draft) and which possess a shrinkage temperature, measured in accordance with DIN 53 336, of at least 65° C., preferably at least 70° C. and, in particular, at least 80° C.

Molecular weights of polymeric compounds for the purposes of this invention are molecular weights determined as the number average (unless specified otherwise).

The percentages in the examples which follow relate in each case to the weight.

EXAMPLES

Assistants Used

| | |
|---|---|
| BAYCHROM CP | chrome tanning agent from Bayer AG, of moderate reactivity for the BAYCHROM C method, with 7.2% chromium oxide |
| BAYGENAL Grau S GL | acid black 220 from Bayer AG |
| BAYGENAL Braun S RL | acid brown 413 from Bayer AG |
| BAYMOL FD fl. | 80% strength aqueous solution of a nonionic emulsifier, from Bayer AG |
| BAYMOL AN | 33% strength aqueous solution of nonionic emulsifiers from Bayer AG |
| CHROMOSAL B | 33% basic chrome tanning agent with 25% chromium oxide, from Bayer AG |
| CHROMOSAL BF | 42% basic, weakly masked chrome tanning agent from Bayer AG with 25% chromium oxide |
| ENSUL AM 90 | approximately 92%, sulphited, natural oil from Zschimmer und Schwarz, D-56112 Lahnstein |
| EUKANOL Schwarz D | aqueous carbon black formulation, finished with the aid of casein, from Bayer AG |
| EUREKA 800 FR | mixture of natural and synthetic oils from Atlas Oil, Newark N.J. (USA) |
| Magnesium oxide | magnesia 322 from Magnesia GmbH, Luneburg |
| BAYGENAL Braun CGG | acid brown 83 from Bayer AG |
| PRINOL F41 | fat-liquoring agent based on polymeric and synthetic products, from Zschirmer & Schwarz |
| LEVADERM Mittelbraun | chromium complex dye in ethoxypropanol, from Bayer AG |
| LEVADERM Braun | chromium complex dye in ethoxypropanol, from Bayer AG |
| LEVADERM Scbwarzbraun | chromium complex dye in ethoxypropanol, from Bayer AG |
| BAYDERM Finish DLF | 40% polyurethane dispersion from Bayer AG |
| DEGRANIL DLN W 50 | 50% polyurethane dispersion from Bayer AG |
| EUDERM Mattierung SN | matting agent slurry in aqueous formulation, from Bayer AG |
| BAYDERM Additiv VL | PU-based viscosity regulator, from Bayer AG |
| EUDERM Fluid G | Levelling agent on an aqueous organic basis, from Bayer AG |
| Quebracho, Mimosa, Chestnut | customary commercial vegetable tanning agents |
| POLYZIM 202 | proteolytic mordant based on pancreas, from Diamalt, D-83064 Raubling |
| PREVENTOL WB | biodegradable preservative from Bayer AG |
| TANIGAN 3 LN | lightfast, synthetic replacement tanning agent and tawing agent, from Bayer AG |
| TANIGAN TF 2N | synthetic organic tanning agent from Bayer AG |
| TANIGAN OS | synthetic organic tanning agent from Bayer AG |

Block Polyisocyanate 1

25 g (0.05 mol) of polyether 2 (see below) are added at room temperature to 168 g (1.00 mol) of hexamethylene diisocyanate and the mixture is heated to 100° C. The temperature is held for 2 hours and then the NCO content is determined (calculated 42.4%, found 41.9%). After cooling to 15° C., 509 g (1.91 mol) of 39% strength aqueous sodium hydrogen sulphite solution are added and stirring is continued for 30 minutes during which the temperature rise is about 45° C. Then the solids content is adjusted to 40% with 267 ml of deionized water. After stirring at room temperature for 7 hours, a water-clear solution having a pH of 5.8 is obtained.

Polvether 2

Ethylene oxide polyether, prepared starting from methanol, with a molecular weight of 500 and an ethylene oxide group content of 93.6%.

Ester Urethane 3

The apparatus used is a heatable, three-necked round-bottomed flask with a capacity of 500 ml which is equipped with stirrer, reflux condenser with drying pipe, and dropping funnel.

17.9 g of glycerol monostearate (0.05 mol) are charged to the flask. 45 mg of dibutyltin diacetate, 50 ml of anhydrous acetone and 14.72 ml (17.9 g) of 2,4-/2,6-tolylene diisocyanate (ratio 80:20) (0.1028 mol) are added in succession. The mixture is then heated at boiling for 30 minutes. Subsequently, 11.75 g of the triethylarnine salt of 2,2-bis (hydroxymethyl)propionic acid (0.05 mol), dissolved in 50 ml of anhydrous acetone, are added dropwise over the course of 10 minutes. After a reaction time of one hour under reflux the formation of the ester urethane is at an end. The solution is clear, moderately viscous and a pale yellow in colour. Then, for dispersion, 250 ml of deionized water are added dropwise while retaining a gentle reflux of acetone. Stripping off the acetone by vacuum distillation results in a clear solution of the ester urethane with a strength of approximately 17%.

Tanning Agent 4

100 g of polysuccinimide having a mean molecular weight Ma of 3000, in 100 g N-methylpyrrolidone, are reacted with 69.5 g of stearylamine (0.25 mol/mol of imide) at 140° C. The batch is stirred at this temperature for 8 hours. Then it is cooled to room temperature. The reaction mixture is poured into excess (1500 ml) methanol, in the course of which the reaction product precipitates in finely particulate form. The product is filtered off through a suction filter, washed with methanol and dried. A light-coloured powder is obtained.

100 g of the resulting product are placed in a solution which has been heated to 80° C. and which consists of 10 g of oleic acid, 4.3 g of monoethanolamine and 342.9 g of water. The dispersion is homogenized at 80° C. for 60 minutes. The particle size is less than 500 nm. The dispersion is adjusted to a solids content of 25% by weight.

Polyurethane dispersion 5

83.4 g of a polyester formed from adipic acid, ethanediol and 1,4-butanediol in a weight ratio of ethanediol:butanediol =1.4:1, with a molecular weight $\overline{M}_n$ of 2000, and 3 g of a monofunctional polyether alcohol with a molecular weight $\overline{M}_n$ of 2240, prepared by alkoxylation of n-butanol using a mixture of propylene oxide and ethylene oxide in a molar ratio PO:EO—1:7.1, are devolatilized at 120° C. in vacuo for 30 minutes. 0.1 g of benzoyl chloride and 13.7 g of hexamethylene diisocyanate are added to the batch in one portion under nitrogen. After stirring at 120° C. for 1 h, the NCO content is 2.84%. The prepolymer is dissolved in 300 g of acetone at 50° C. and, at room temperature, a mixture of 4.8 g of a 50% strength aqueous solution of sodium salt of N-(2-aminoethyl)-2-aminoethanesulphonic acid (AAS salt) and 1.15 g of ethylenediamine and 20 g of water is added. After 15 minutes, 230 g of water are added and the acetone is removed at 60° C. and 140 mbar. The distillation residue which remains comprises 337 g of a thin white dispersion with 30% polyurethane.

Example 1

Limed pelt is split into 2.2 mm. The pelt is then placed in a customary tanning drum and is washed once 200% (% figures hereinbelow relate to split weight) of water at 30° C. for 10 minutes. The liquor is then drained. In the subsequent deliming, 30% of water at 30° C., 2% of ammonium sulphate and 0.2% of sodium meta-bisulphite are added and the drum is agitated for 10 minutes. Then 0.2% of formic acid (diluted 1:10) and 0.2% of BAYMOL FD flussig [liquid] are added and the liquor is left for 20 minutes. Mordanting is carried out with 0.5% of Polyzim 202 in the same liquor for 30 minutes. The resulting pH is 8.4. (cut of the pelt with phenolphthalein is colourless.). The liquor is then drained.

The treated pelt is washed twice with 150% of water (at room temperature) and the liquor is drained.

A quantity of leather is removed and is processed further in accordance with Example 1.1. In the tannage which now begins, 30% of water at 30° C. is introduced, and 0.35% of magnesium oxide (Magnesia 322) and, after 60 minutes, 75% of the blocked polyisocyanate 1 are added. After a running time of 5 hours a pH of 7.1 becomes established; a further 0.35% of magnesium oxide (Magnesia 322) is added and operation continues overnight (final pH 9.4); on the next morning the resulting leather has a shrinkage temperature of 78° C.

The liquor is drained and the leathers are rinsed at room temperature for 10 minutes, then sammied and shaved to a thickness of 1.0 mm.

The shaved leathers are placed in a drum and washed for 10 minutes with 200% of water at 30° C. (% figures are based on shaved weight). The liquor is drained. 0.5% of formic acid (diluted with water in a ratio of 1:4) is added to a new liquor of 100% water, 40° C. After 60 minutes a pH of 4.8 becomes established. 8.3% of the tanning agent 4 is then added to this liquor, and operation continues for 30 minutes. Subsequently, 2% of ENSUL AM 90 is added and operation continues for a further 60 minutes before then adding 4% of the ester urethane 3. After a running time of 30 minutes a mixture of 3% TANIGAN 3 LN and 3% sweetened chestnut is added and operation continues for 40 minutes.

This is followed by a 40-minute precolouring with a mixture of 4% BAYGENAL Grau S-GL and 0.4% BAYGENAL Braun S-RL and initial fat liquoring in 30 minutes weith 4% of EUREKA 800 FR (diluted with water in a ratio of 1:4). The liquor is then increased by 100% with water at a temperature of 50° C., and operation is continued for 5 minutes before then adding 2% of formic acid (diluted with water in the ratio of 1:4). After a running time of 15 minutes a pH of 4.9 becomes established.

The liquor was then drained. In a fresh liquor of 100% water, 50° C., subsequent fat liquoring was carried out with 8% EUREKA 800 FR (diluted with water in a ratio of 1:4) in 30 minutes. The liquor is drained. In a new liquor of 200% water, 50° C., overcolouring was then carried out with 2% of BAYGENAL S-GL and 0.2% of BAYGENAL Braun S-RL in 30 minutes. Subsequently, by adding 1% of formic acid (diluted with water in a ratio of 1:4) in 20 minutes, a final pH of 3.1 was established. The liquor was drained off and the leathers were rinsed in overflow for 5 minutes with water at 25° C.

The leathers were stored overnight on the trestle, then subjected to wet stretching, air drying, climatic conditioning, staking, milling, further stretching and partial dressing.

Example 1.1 (Comparative)

Part of the limed and delimed pelt prepared in Example 1 was tanned as follows with mineral tanning agent. The pelt is treated in 20% water, 20° C., with 4% sodium chloride (figures relate to the pelt weight) for 5 minutes, with 0.5% PREVENTOL WB (diluted with water in a ratio of 1:2) for 10 minutes and with 1% of 96% strength sulphuric acid (diluted with water in a ratio of 1:10) for 60 minutes. A pH of 3.0 becomes established. 4.8% of CHROMOSAL BF is added to the same liquor and agitation is carried out at intervals in a running time overnight (8 hours). A pH of 3.7 becomes established. The liquor is drained and the leathers are rinsed in overflow with water at 30° C. for 5 minutes. The leathers are then sammied and shaved to 1 mm.

The leathers are put back into the drum and 100% of water, 40° C. (% figures from now on relate to shaved weight), 1% sodium formate and 1% sodium bicarbonate are added. After 45 minutes the pH becomes established at 4.9.

Then 4% of CHROMOSAL B and, after 20 minutes, 4% of ENSUL AM 90 (diluted with water in a ratio of 1:4) are added. After a running time of 60 minutes the pH becomes established at 4.2.

The liquor is drained and the leathers are washed in 300% of water, 40° C., for 10 minutes. In a fresh liquor of 100% water, 40° C., 4% of the ester urethane 3 is added. After 30 minutes there is a further addition of 3% of TANIGAN LN and 3% of sweetened chestnut. After a further 40 minutes precolouring takes place with 2% of TANIGAN FF-2N, 4% of BAYGENAL Grau S-GL in 0.4% of BAYGENAL Braun S-RL. After 60 minutes, initial fat liquoring takes place with 4% of EUREKA 800 FR (diluted with water in a ratio of 1:4). After 30 minutes the liquor is increased with 100% of water at 50° C. After 5 minutes 2% of formic acid (diluted with water in a ratio of 1:10) in 2 portions is added over the course of 15 minutes. A pH of 3.0 becomes established.

The liquor is drained. In a new liquor, 100% water, 50° C., the main fat liquoring takes place with 8% of EUREKA 800 FR (diluted with water in a ratio of 1:4) in 45 minutes. The liquor is drained.

In a new liquor, 200% of water, 50° C., overdying takes place with 2% of BAYGENAL Grau S-GL and 0.2% of BAYGENAL Braun S-RL in 30 minutes. The liquor is then acidified with 1% of formic acid (diluted with water in a ratio of 1:10) in 30 minutes to a pH of 2.9.

The liquor is drained and the leathers are rinsed in the overflow with water at 25° C. for 5 minutes. The leathers are stored overnight on the trestle and then subjected to wet stretching, air drying, climatic conditioning, staking, milling, further stretching and partial dressing.

Testing for Biodegradability

The pieces of leather to be tested were first of all dried to constant weight and then clamped into 6×6 cm transparency frames. Compost from a composting plant was placed to a depth of 2 cm in plastic dishes and the samples were laid in these dishes. The filled boxes were incubated for in each case 4 weeks in succession at 60, 50 and 37° C. in an incubator. Water losses were determined by way of the weight loss, compensated by adding distilled water. During incubation, the pH of the compost was measured once a week. After 4 weeks in each case one batch was terminated, and the samples were removed, cleaned, dried at 80° C. to constant weight and photographed. Directly after drying, the weight loss was determined by re-weighing.

A material was designated as degradable if, like the cellulose film employed in a parallel experiment, it disappeared completely or showed clear traces of degradation.

Leather 1 had degraded completely after 3 months, leather 1.1 only to an extent of 5%.

Example 2

A leather prepared in accordance with Example 1 is dressed by the following method:
Bottoming:

50 g of EUKANOL Schwarz D and 150 g of polyurethane dispersion 5 are mixed with 500 g of water. This mixture is sprayed onto the leather prepared in accordance with Example 1 (3 (cross) spray applications (8/5/4 g/qfs)). Then a further spray application (1 (cross-pass) (4 g/qfs)) is performed, and the leather is dried and ironed at 80° C. under 200 bar for 6 seconds. Then a further 1 cross-pass (4 g/qfs) of the bottoming solution is applied by the spray technique.
Finishing:

300 g of the polyurethane dispersion 5 are added to 100 g of casein solution (an aqueous solution is prepared at 40° C. from 13 g of casein with 8 g of aqueous ammonia and 79 g of water) and 500 g of water are added. One and a half cross-passes (6 g/qfs) of this finishing solution are sprayed onto the bottomed leather. Then one and a half cross-passes of a 10% strength aqueous formalin solution are sprayed in succession and the leather is dried and ironed at 80° C. and 150 bar.

The leather thus dressed withstood 20,000 wet creasing and 100,000 dry creasing operations (in accordance with DIN 53 351) and 2000 dry rubs and 40 wet rubs (in accordance with DIN 53 339) without damage.

Example 3

It is also possible analogously to prepare coated split leathers according to the invention which are likewise biodegradable.
Tanning Procedure

| Material/thickness | Pelt splits | | Colour | Brown | |
|---|---|---|---|---|---|
| Leather type | Chrome-free splits for coating | | | | |
| % based on | Pelt weight | | | | |
| Initial charge | | | tanned | in 2 drums | |
| Pelt weight | 15,400 grams/4700 and 2600 grams | | | | |
| | | | | Time | |
| Operation | + | % Product | ° C. | Min | Notes |

| | | | | | | |
|---|---|---|---|---|---|---|
| | | | -continued | | | |
| Washing (2×) | | 150 | Water | 35 | 10 | |
| Mordant | | | without liquor | 35 | | (20 P) |
| Deliming | | 2.5 | Ammonium sulphate | | | |
| | | 0.3 | Sodium bisulphite | | 10 | |
| | + | 0.4 | Formic acid (1:10) | | | |
| | | 0.2 | BAYMOL AN | | 50 | |
| | + | 30 | Water | 35 | | |
| | | 0.5 | POLYZIM 202 Colourless | | 45 | pH: 7.7 Drain liquor |
| Washing | | 150 | Water | 20 | 10 | Drain liquor |
| Tanning | | 50 | Water | 35 | | |
| | | 0.8 | Magnesium oxide (Type 303) | | 120 | pH: 9.94 |
| | + | 12.0 | Blocked isocyanate 1 | | | Overnight (10 P) pH: 7.7 Ts: 78° C. |
| | | | Rinsing, sammying, shaving: | | | |

Retanning Procedure

| Figures based on shaved weight (4700 g and 2600 g) | | | | | | |
|---|---|---|---|---|---|---|
| Washing | | 100 | Water | 30 | 10 | Liquor of |
| | | 100 | Water | 30 | | |
| | | 2.0 | NaCl | | 5 | |
| | | 0.4 | Formic acid (1:10) | | 60 | Drain liquor pH: 5.01/5.05 |
| Retanning | | 100 | Water | 40 | | |
| | | 2.0 | LEVOTAN C (1:3) | | | |
| | | 2.5 | BAYTIGAN AR (1:3) | | 45 | |
| | + | 6.0 | TANIGAN OS | | 15 | |
| | + | 5.0 | BAYGENAL Braun CCG | | | |
| | | 2.0 | BAYKANAL TF-2N | | 30 | |
| | + | 2.7 | Chromopol SG | | 30 | pH: 5.35/5.55 |
| | + | 1.6 | Formic acid (1:10) | | 30 | pH: 4.16/4.25 Drain liquor |
| | | | Rinsing | 40 | 10 | |
| Fat liquoring | | 100 | Water | 60 | | |
| | | 11 | PRINOL F 41 (in 2 portions) | | 90 | pH: 5.12/5.28 |
| | | 1.5 | Formic acid (1:10) | | | |
| | | 1.5 | in 2 portions | | 40 | pH: 3.68/3.66 |
| Rinsing (2×) | | | Water | 25 | 10 | |

Coating

| Top coat | 1 | 2 | 3 | 4 | Notes |
|---|---|---|---|---|---|
| BAYDERM Finish DLF | 500 | | | | LEVADERM Mix comprising: |
| DEGRANIL DLN-W50 | 500 | | | | |
| EUDERM Mattierung SN | 50 | | | | Medium brown 5 parts |
| LEVADERM dyes liq. Mix | 7 | | | | Brown 1 part |
| Hansa wet 5878 (HTC) | 20 | | | | Black-brown 1 part |
| BAYDERM Additiv VL | 35 | | | | |
| EUDERM Fluid C | 40 | | | | |

Air doctor 0.04 mm Solids add-on 15 g/m² Temperature 130-160-190° C.

| Top coat/Middle coat | 1 | 2 | 3 | 4 | Notes | |
|---|---|---|---|---|---|---|
| DEGRANIL DLN-W50 | 1000 | | | | EUDERM Pigm. Mix | |
| EUDERM Mattierung SN | 40 | | | | Caramel | 44 parts |
| | | | | | Dark brown | 43 parts |
| EUDERM Pigment mix | 150 | | | | White D-CR | 13 parts |
| BAYDERM Additiv VL | 35 | | | | Base black D-C | part |

Doctor blade gap 0.13 mm Solids add-on 55 g/m² Temperature 130-160-190° C.

| Adhesion coat | 1 | 2 | 3 | 4 | Notes |
|---|---|---|---|---|---|
| BAYDERM Grund DLN-W50 | 1000 | | | | |
| BAYDERM Additiv VL | 40 | | | | |

Doctor blade gap 0.18 mm Solids add-on 55 g/m² Temperature 00-120-130° C.

What is claitned is:

1. A process for preparing leather comprising
   (I) tanning a pelt with
     (a) an aldehyde, or
     (b) a bisulphite-blocked polyisocyanate;
   (II) retanning the pelt with
     (a) a polyaspartic acid, a salt of a polyaspartic acid, a polyaspartic acid anhydride, or a mixture thereof, and/or
     (b) a polyaspartamide;
   (III) dressing the resultant product by
     (a) bottoming the product with a polyurethane and one or more natural bottoming assistants, and
     (b) applying a polyurethane and/or polyesteramide finish; and
   (IV) optionally, aftertreating the resultant dressed leather with a leather preservative.

2. A process according to claim 1 wherein the tanning agents and assistants are at least 30% by weight biodegradable in accordance with DIN 54,900, Part 3 (draft).

3. A leather prepared according to the process of claim 1.

4. A leather prepared according to the process of claim 1 that is at least 30% by weight biodegradable in accordance with DIN 54,900, Part 3 (draft).

5. A leather according to claim 4 having a shrinkage temperature of at least 70° C.

6. A leather according to claim 4 having a shrinkage temperature of at least 80° C.

7. A leather article made from a leather prepared according to the process of claim 1.

* * * * *